(12) United States Patent
Orcutt

(10) Patent No.: US 7,595,924 B2
(45) Date of Patent: Sep. 29, 2009

(54) BRACKET FOR PIEZOELECTRIC DRIVE TORSIONAL HINGE MIRROR

(75) Inventor: John Walter Orcutt, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 386 days.

(21) Appl. No.: 11/551,930

(22) Filed: Oct. 23, 2006

(65) Prior Publication Data
US 2007/0091441 A1 Apr. 26, 2007

Related U.S. Application Data

(60) Provisional application No. 60/729,589, filed on Oct. 24, 2005.

(51) Int. Cl.
*G02B 26/08* (2006.01)
(52) U.S. Cl. ............... 359/224.1; 359/198.1; 359/199.1
(58) Field of Classification Search ......... 359/198–199, 359/224
See application file for complete search history.

(56) References Cited

U.S. PATENT DOCUMENTS

| 7,006,268 B2 | 2/2006 | Orcutt |
| 2007/0053045 A1* | 3/2007 | Turner et al. ............... 359/224 |

* cited by examiner

*Primary Examiner*—James Phan
(74) *Attorney, Agent, or Firm*—William B. Kempler; Wade J. Brady, III; Frederick J. Telecky, Jr.

(57) ABSTRACT

A combination pivoting mirror and support bracket has a bracket for supporting a pivoting mirror assembly and for attaching the combination to a using device. The bracket has first and second edges. A first portion of the bracket defines a mounting area for fixedly securing the first portion to the using device, and a second portion of the bracket is for mounting the pivoting mirror. An isolation slot is formed in the bracket and located between the first portion of the bracket and the second portion of the bracket. A plurality of piezoelectric devices are mounted to the second portion of the bracket and extend substantially orthogonal to a surface of the bracket. A pivoting mirror has a pair of torsional hinges for pivotally supporting a reflective surface. Each hinge of the pair extends away from the reflecting surface and along a selected axis to an anchor portion. The anchor portion of each hinge is mounted to a distal end of at least one of the piezoelectric devices to suspend the pivoting mirror above the surface of the bracket.

18 Claims, 3 Drawing Sheets

BRACKET FOR PIEZOELECTRIC DRIVE TORSIONAL HINGE MIRROR

CROSS REFERENCE TO RELATED APPLICATIONS

This application claims the benefit of application Ser. No. 60/729,589 filed Oct. 24, 2005 which is incorporated herein by reference in its entirety.

TECHNICAL FIELD

The present invention relates generally to the field of MEMS scanning mirrors which are supported by torsional hinges and more particularly to a mounting bracket that substantially reduces or eliminates stresses on piezoelectric driving devices for the MEMS mirror when the mounting bracket is secured to a using device.

BACKGROUND OF THE INVENTION

It is known in the art to produce MEMS mirror assemblies by micromachining components from a single piece of silicon, for example. These assemblies have a central area containing the mirror or a platform designed to support a separate mirror and a pair of torsional hinges extending from the central mirror portion radially outward to an anchor frame or anchor pads which are used to attach the mirror to its mounting.

These mirrors are suitable for use to provide the repetitive modulating scans of a laser printer or the raster scan of a projection display. The reflective surface of the mirror may have many suitable shapes, such as oval, elongated or elliptical, rectangular, square or other suitable shape. The mirrors are designed such that the pivotal resonance of the mirror about its torsional hinges matches the selected scanning frequency for the mirror. Thus, by designing the mirror hinges so that the mirror resonates at this selected frequency, the scanning beam sweep can be produced using only a small amount of energy to maintain the resonance.

It has been be found experimentally that the stress loading of attaching the bracket to the using device stresses the piezoelectric drive elements and causes a shift in the resonant frequency of the mirror assembly and drive and/or a change in the amplitude response so that much more power is required to drive the pivoting motion of the mirror, thus requiring a more robust driving circuit. The amount of power required to drive a piezoelectric can increase by ten fold, for example. The additional power required is significant in battery power devices. Furthermore, resonant frequency changes will affect the scanning of the image that is being projected.

Accordingly, there is a need for simple, inexpensive technique for reducing the stress loading on the piezoelectric devices which does not increase the size of the mounting bracket.

SUMMARY OF THE INVENTION

It is a general object of the present invention to reduce or eliminate mounting stresses on a piezoelectric drive for a resonant mirror.

This and other objects and feature are provided, in accordance with one aspect of the invention by a combination pivoting mirror and support bracket assembly comprising a bracket for supporting a pivoting mirror and for attaching the pivoting mirror to a using device. The bracket has first and second edges. A first portion of the bracket defines a mounting area for fixedly securing the first portion to the using device and a second portion of the bracket is for mounting the pivoting mirror. An isolation slot is formed in the bracket and located between the first portion of the bracket and the second portion of the bracket. A plurality of piezoelectric devices are mounted to the second portion of the bracket and extend outwardly from a surface of the bracket. A pivoting mirror comprises a pair of torsional hinges that pivotally support a reflective surface, each hinge of the pair extending away from the reflective surface and along a selected axis to an anchor portion. The anchor portion of each hinge is mounted to a distal end of at least one of the piezoelectric devices to suspend the pivoting mirror above the surface of the bracket.

Another aspect of the invention includes a method of reducing stress on piezoelectric devices, for pivoting a mirror supported by a pair of torsional hinges attached to the piezoelectric devices, transmitted through a mounting bracket. A bracket is provided having first and second edges. A first portion is defined having a mounting area for fixedly securing the first portion to a using device. A second portion is defined having a plurality of piezoelectric devices mounted thereon, the piezoelectric devices extending outwardly from a surface of the bracket. A pivoting mirror is attached to the piezoelectric devices by anchors attached to distal ends of torsional hinges of the mirror. An isolation slot is defined between the first and second portions. The assembly comprising the bracket, piezoelectric devices and mirror is attached to the using device.

BREIF DESCRIPTION OF THE DRAWINGS

For more complete understanding of the present invention, and the advantages there are, references now made to the following description taken in conjunction with the accompany drawings, in which.

DETAILED DESCRIPTION

The making and using of the presently preferred embodiments are discussed in detail below. It should appreciated, however, that the present invention provides many applicable inventive concepts that could embodied in a wide variety of specific concepts. The specific embodiments discussed are merely illustrative of specific ways to use the invention, and do not limit the scope of the invention.

Like reference numbers in the figures are used herein to designate like elements throughout the various views of the present invention. The figures are not intended to be drawn to scale and in some instances for illustrative purposes, the drawings may intentionally not be to scale. One of ordinary skill of the art would appreciate the many possible applications and variations of the present invention based on the following examples of possible embodiments of the present invention.

Figure 1:
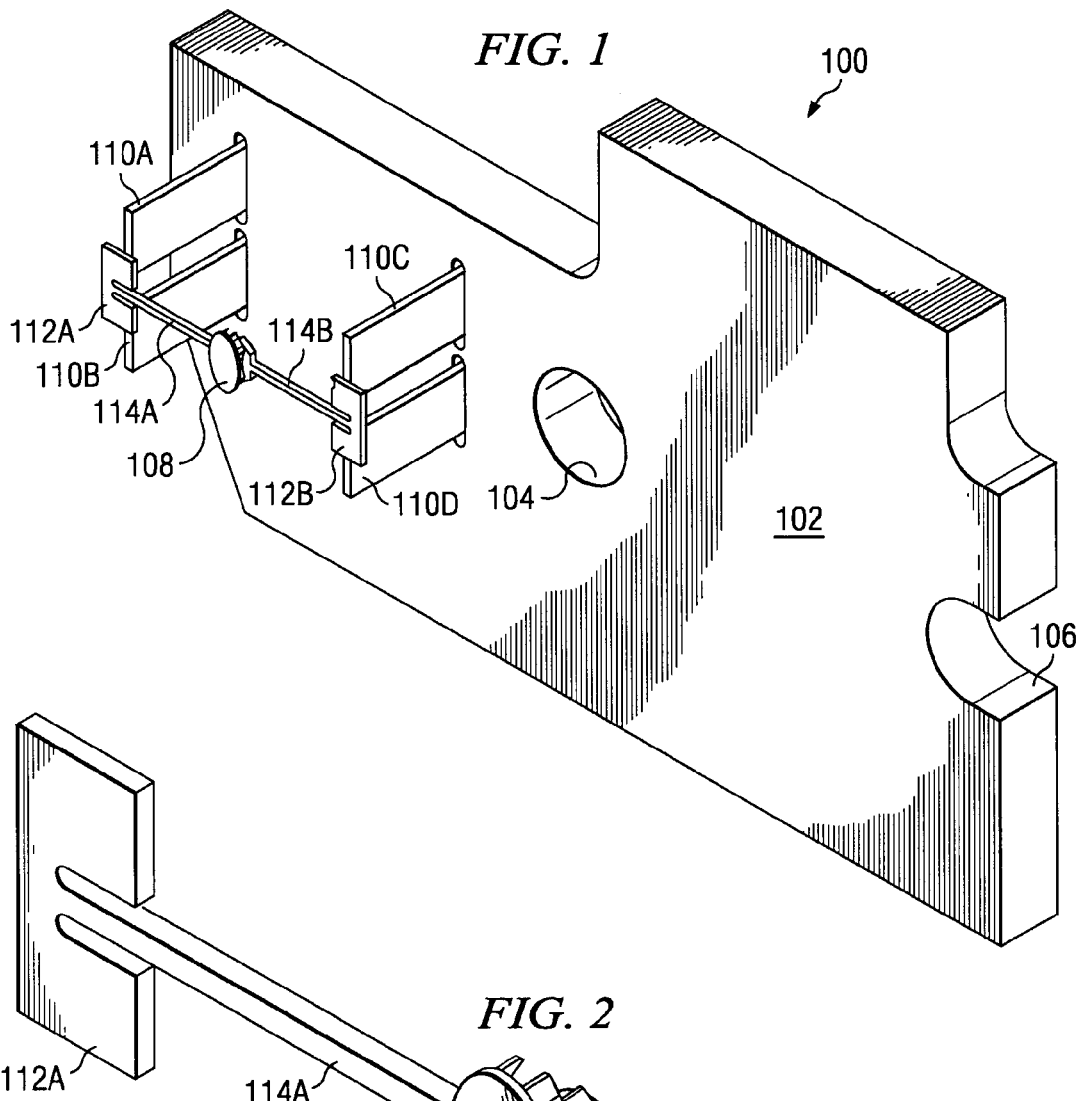
FIG. 1 is a perspective view of a mounting bracket and mirror assembly which does not utilize the stress reduces technique of the present invention.

Referring now to FIG. 1, a mounting bracket and mirror assembly is shown generally as 100. The combination 100 has a mounting bracket 102 which may be a printed circuit board, for example. The printed circuit board has mounting holes 104, 106 for attaching the printed circuit board to a user device. As shown in FIG. 1, the mounting hole 106 comprises a slot for ease of mounting. Attached to the printed circuit board 102 are four piezoelectric elements 110A, 110B, 110C and 110D. The piezoelectric elements are soldered, for example, to circuit traces on the printed circuit board (not shown) which are used to carry the drive signals to the piezoelectric elements 110A, 1108, 110C and 110D. As seen in the drawing, the piezoelectric elements stand outwardly from the surface to the bracket 102 substantially perpendicular 102 thereto. A pivoting mirror 108 has torsional hinges 114A and 114B which radiate in opposite directions outwardly from the central mirror 108. The distal ends of the torsional hinges 114A and 114B terminate in anchor pads 112A and 112B, respectively. Anchor pad 112A is attached to piezoelectric elements 110A and 110B and anchor pad 112B is attached to anchor pads 110C and 110D by epoxy glue, for example.

The application of drive signals to the piezoelectric elements causes them to shorten or lengthen dependent upon the polarity of the signal, as it is well known in the art. The signals are applied via the printed circuit board traces (not shown) from a driver circuit (not shown) such that the piezoelectric elements 110B and 110D will lengthen and piezoelectric elements 110A and 110C will shorten, and vice versa, in order to impart a rocking motion to the anchor pads 112A and 112B. The rocking motion at the anchor pads 112A and 1128 will be inertially coupled through torsional hinges 114A and 1148 to the mirror 108 to cause it to pivot about the hinges. if the frequency of the motion of the piezoelectric elements matches the resonant frequency of the mirror 108, it will pivot about the hinges at its resonant frequency with a minimal amount of power needed. It has been determined experimentally that when the bracket 102 is attached to a using device by screws in mounting holes 104, 106, the stresses induced in the mounting bracket 102 are transmitted to the piezoelectric elements 110A, 110B, 110C and 110D which in turn requires a significant increase in the amount of power required to drive the piezoelectric elements which in turn drives the resonant mirror 108 and/or change the resonant frequency of the mirror assembly.

Figure 2:
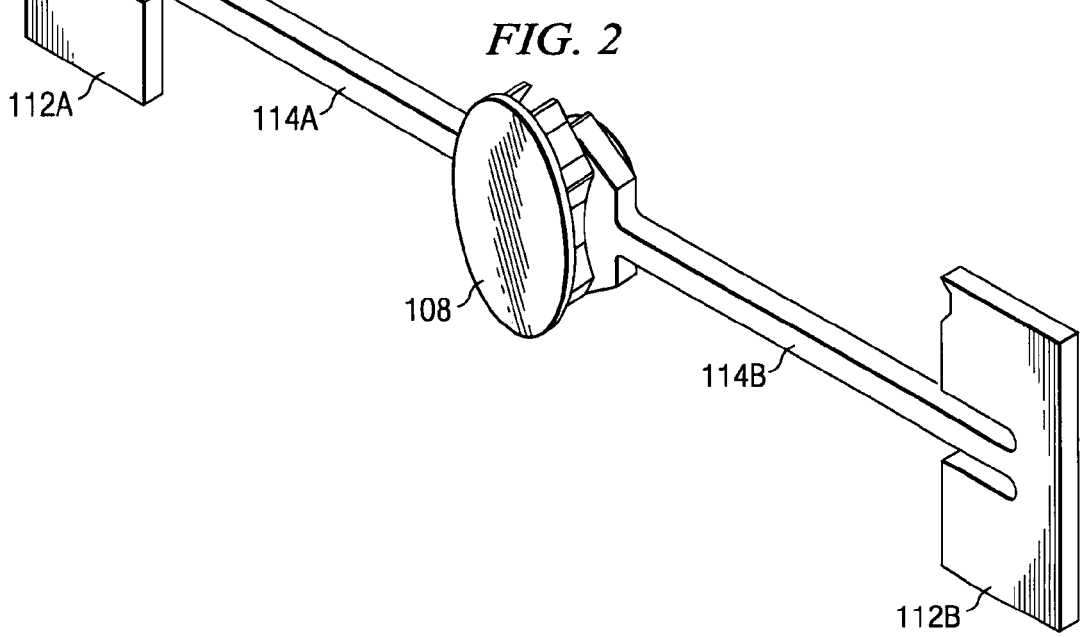
FIG. 2 is a front view of the mirror assembly shown in FIG. 1.

FIG. 2 is an enlarged front view of the mirror 108 shown in FIG. 1. The mirror, its torsional hinges and anchor pads are preferable formed from a single piece of material, such a silicon by a micromachining to produce a MEMS structure. These techniques are well known in the art and need not be described in detail here. The hinges 114A and 114B are designed to produce resonance at the desired scanning frequency for the using device using techniques also well known in the art. The shape of the anchor pads 112A and 112B is chosen so that it is easy to mount to the piezoelectric elements 110A, 110B, 1100 and 110D and other shapes than the one shown in FIG. 2 can be utilized. The mirror 108 has a polished surface which may have a metal such as gold plated thereto for improve reflectivity.

Figure 3:
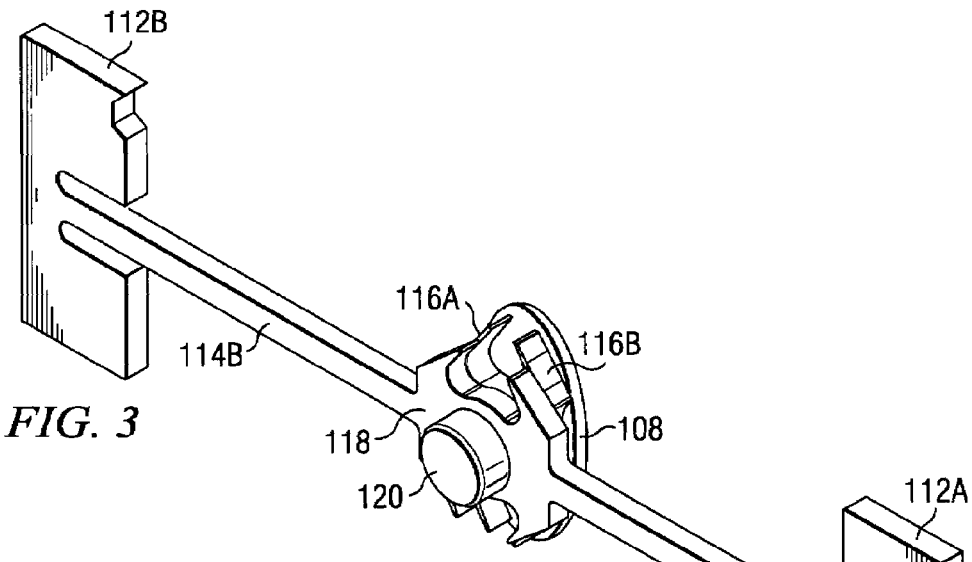
FIG. 3 is a rear view of the mirror assembly shown in FIG. 1.

FIG. 3 shows an enlarged rear view of the mirror shown in FIG. 2. As can be seen from FIG. 3, it is possible to have the mirror 108 as a separate element from a support structure 118 which is formed as a single piece to include the torsional hinges 114 and the anchor members 112. The mirror is then attached to the support member. Also shown from the rear view of the mirror are splines 116A and 116B which allow the mirror 108 to be thinner without unacceptable flex when the mirror is operated at its resonant frequency, which may be 20 kHz, for example. Similar strengthening structures are shown in the support structure 118. Also shown in FIG. 3 is an optional magnet 120 which is attached to the support structure 118 on the side opposite mirror 108. The magnet 120 is used with a sensing coil which is mounted directly beneath the magnet 120 on the printed circuit board mounting bracket 102 (not shown) to detect the position of the mirror so that the mirror operation can be synchronized with the image that is being generated.

Figure 4:
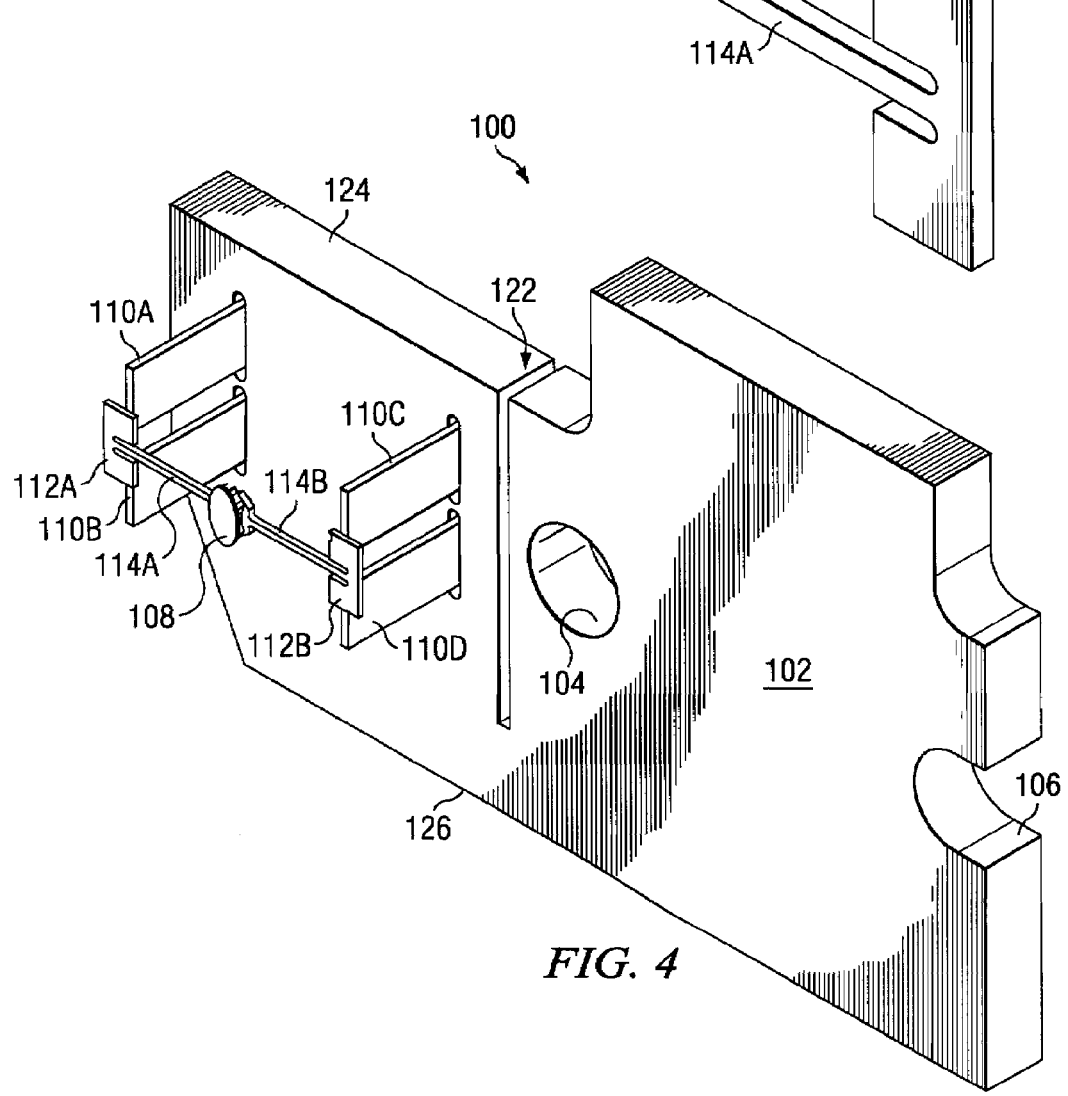
FIG. 4 is a perspective view of assembly of FIG. 1 showing one embodiment of the stress reducing technique of the present invention.

FIG. 4 illustrates the mirror and bracket combination 100 shown in FIG. 1 in which the present invention has been implemented. In FIG. 4 an isolation slot is cut from edge 124 of mounting bracket 102 part of the way to edge 126 on the opposite side of the mounting bracket from edge 124. The portion of the mounting bracket that is not cut through provides the support for the portion of the bracket containing the piezoelectric devices and resonanting mirror assembly and provides a place for the circuit traces to pass between the sections of the mounting bracket (not shown).

Figure 5:
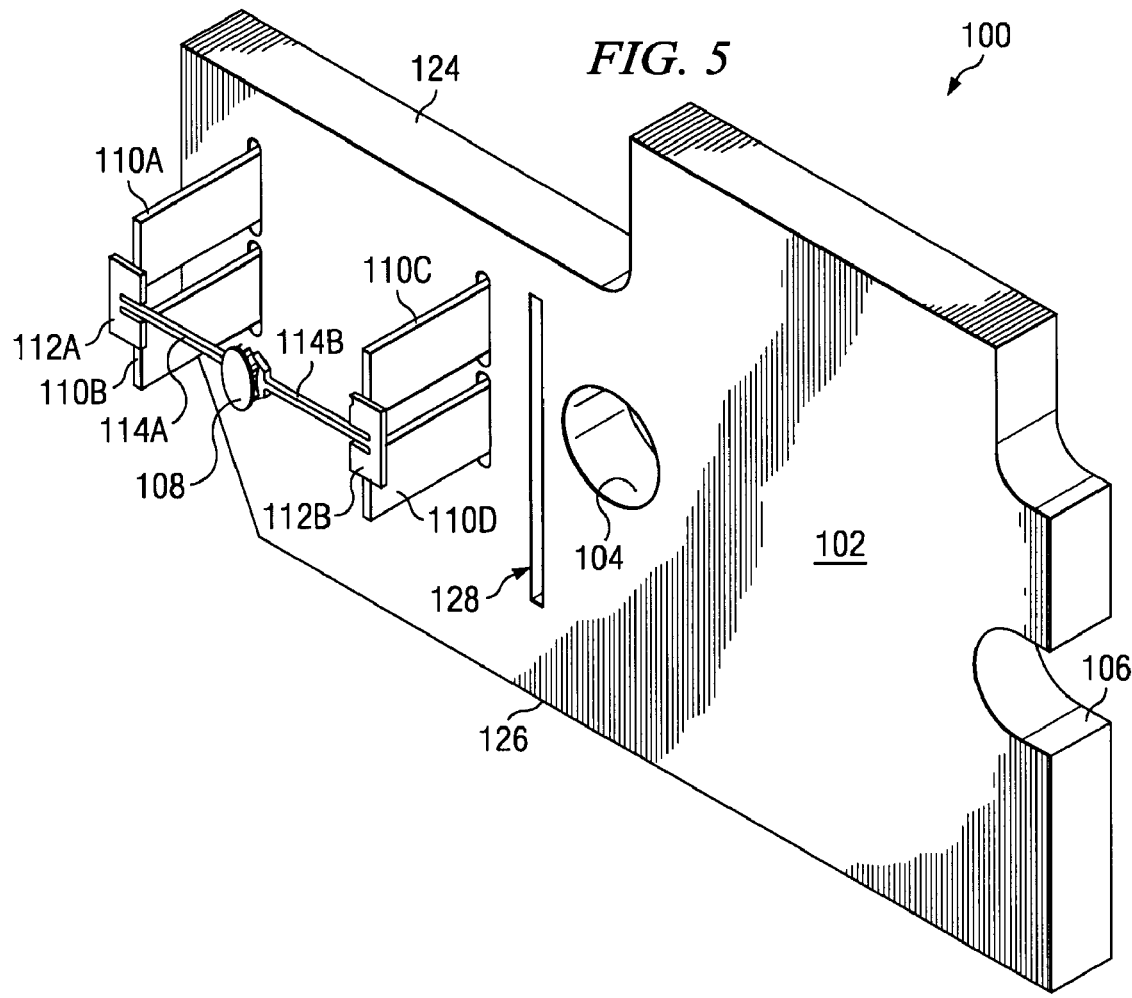
FIG. 5 is a perspective view of assembly of FIG. 1 showing a second embodiment of the stress reducing technique of the present invention.

FIG. 5 shows an alternate embodiment of the present invention. In this figure, instead of the slot 122 being cut from one edge of the mounting bracket, a slot 128 is cut between edge 124 and 126 by plunge cutting, for example. In this case two sections of the bracket 102 are free to go carry the portion of the bracket containing the piezoelectric elements 110A, 1108, 110C and 110D and pivoting mirror assembly and provide a place for the circuit traces to run (not shown).

It has been determined that the cutting of the slot 124 or 128 allows the bracket 102 to be attached to a using device by a screw mounting 104 and 106 with minimal effect of the resonant frequency of the piezoelectric elements or the amount of power required to drive these elements. Thus, a simple and low cost solution is provided it does not affect the size of the mounting bracket, which is a critical concern in miniaturized devices.

While the invention has been particularly shown and described with reference in preferred embodiments thereof it is well understood by those skilled in the art that various changes and modifications can be made in the invention without departing from the spirit and scope of the invention as defined by the appended claims.

What is claimed is:

1. A combination pivoting mirror and support bracket assembly comprising:

a bracket for supporting a pivoting mirror and for attaching the pivoting mirror to a using device, the bracket having first and second edges, a first portion of the bracket defining a mounting area for fixedly securing the first portion to the using device, and a second portion for mounting the pivoting mirror, and an isolation slot formed in the bracket and located between the first portion of the bracket and the second portion of the bracket, wherein stress induced in the first portion of the bracket when attached to the using device is isolated from the second portion of the bracket for mounting the pivoting mirror;

a plurality of piezoelectric devices mounted to the second portion of the bracket and extending outwardly from a surface of the bracket;

a pivoting mirror assembly comprising a pair of torsional hinges for pivotally supporting a reflective surface, each hinge of the pair extending away from the reflecting surface and along a selected axis to an anchor portion, the anchor portion of each hinge mounted to a distal end of at least one of the piezoelectric devices to suspend the pivoting mirror above the surface of the bracket.

2. The assembly of claim 1 wherein the plurality of piezoelectric devices is 4 devices and the anchor portion of each hinge being mounted to 2 piezoelectric devices.

3. The assembly of claim 1 wherein the isolation slot starts at the first edge of the bracket and extends into the bracket towards the second edge of the bracket.

4. The assembly of claim 2 wherein the isolation slot starts at the first edge of the bracket and extends into the bracket towards the second edge of the bracket.

5. The assembly of claim 1 wherein the isolation slot is located between the first and second edges of the bracket.

6. The assembly of claim 2 wherein the isolation slot is located between the first and second edges of the bracket.

7. A method of reducing stress on piezoelectric devices, for pivoting a mirror supported by a pair of torsional hinges attached to the piezoelectric devices, transmitted through a mounting bracket comprising:

providing a bracket having first and second edges;

defining a first portion having a mounting area for fixedly securing the first portion to a using device;

defining a second portion having a plurality of piezoelectric devices mounted thereon, the piezoelectric devices extending outwardly from a surface of the bracket;

attaching a pivoting mirror assembly to the piezoelectric devices by anchors attached to distal ends of torsional hinges attached to the mirror;

defining an isolation slot between the first and second portions; attaching the assembly comprising the bracket, piezoelectric devices and mirror to the using device, wherein stress induced in the first portion of the bracket when attached to the using device is isolated from the second portion of the bracket for mounting the pivoting mirror.

8. The method of claim 7 wherein the plurality is 4.

9. The method of claim 7 wherein the isolation slot starts at the first edge of the bracket and extends into the bracket towards the second edge of the bracket.

10. The method of claim 8 wherein the isolation slot starts at the first edge of the bracket and extends into the bracket towards the second edge of the bracket.

11. The method of claim 7 wherein the isolation slot is located between the first and second edges of the bracket.

12. The method of claim 8 wherein the isolation slot is located between the first and second edges of the bracket.

13. The method of claim 7 wherein the piezoelectric devices extend substantially orthogonal to the surface of the bracket.

14. The assembly of claim 1 wherein the piezoelectric devices extend substantially orthogonal to the surface of the bracket.

15. 1. A combination pivoting mirror and support bracket assembly comprising:

a bracket for supporting a pivoting mirror and for attaching the pivoting mirror to a using device, the bracket having first and second edges, a first portion of the bracket defining a mounting area for fixedly securing the first portion to the using device, and a second portion for mounting the pivoting mirror, and an isolation slot formed in the bracket and located between the first portion of the bracket and the second portion of the bracket;

a plurality of piezoelectric devices mounted to the second portion of the bracket and extending outwardly from a surface of the bracket;

a pivoting mirror assembly comprising a pair of torsional hinges for pivotally supporting a reflective surface, each hinge of the pair extending away from the reflecting surface and along a selected axis to an anchor portion, the anchor portion of each hinge mounted to a distal end of at least one of the piezoelectric devices to suspend the pivoting mirror above the surface of the bracket, wherein the isolation slot starts at the first edge of the bracket and extends into the bracket towards the second edge of the bracket.

16. The assembly of claim 15 wherein the plurality of piezoelectric devices is 4 devices and the anchor portion of each hinge being mounted to 2 piezoelectric devices.

17. A method of reducing stress on piezoelectric devices, for pivoting a mirror supported by a pair of torsional hinges attached to the piezoelectric devices, transmitted through a mounting bracket comprising:

providing a bracket having first and second edges;

defining a first portion having a mounting area for fixedly securing the first portion to a using device;

defining a second portion having a plurality of piezoelectric devices mounted thereon, the piezoelectric devices extending outwardly from a surface of the bracket;

attaching a pivoting mirror assembly to the piezoelectric devices by anchors attached to distal ends of torsional hinges attached to the mirror;

defining an isolation slot between the first and second portions; attaching the assembly comprising the bracket, piezoelectric devices and mirror to the using device, wherein the isolation slot starts at the first edge of the bracket and extends into the bracket towards the second edge of the bracket.

18. The method of claim 17 wherein the plurality is 4.

* * * * *